May 13, 1969  C. H. STENDER  3,443,521
PUMPING EQUIPMENT AND OPERATING MECHANISM
Filed Jan. 26, 1967

INVENTOR.
Carl H. Stender
BY
ATTORNEYS

# United States Patent Office 3,443,521
Patented May 13, 1969

3,443,521
PUMPING EQUIPMENT AND OPERATING MECHANISM
Carl H. Stender, 361 Baker St.,
Corpus Christi, Tex. 78408
Filed Jan. 26, 1967, Ser. No. 612,031
Int. Cl. F04b 49/02; F01b 25/26, 31/12
U.S. Cl. 103—38                                4 Claims

ABSTRACT OF THE DISCLOSURE

Pumping equipment including pump diaphragm, pump operating mechanism including means adjustable to vary the pump stroke and including means for shutting off the pump and also the pump supply line in the event of diaphragm leakage, and control system for adjusting the operating mechanism manually or automatically including means for varying the ratio of control adjustment.

---

This invention relates to pumping equipment and operating and control mechanism therefor.

Various types of pump operating equipment incorporate an adjustable member for varying the stroke of the pump. One of the principal objects of the present invention is concerned with the provision of a control system for such an adjustable operating mechanism in which provision is made for varying the ratio of adjustment of the operating mechanism for a given adjustment or setting of the control system.

The operating equipment and control system of the present invention are also especially adapted for use with a pump incorporating a pumping diaphragm, thereby providing a simple form of variable stroke pumping and pump operating equipment capable of production and maintenance at low cost.

In accordance with another aspect of the invention, provision is made for shutting off the pump operating equipment and also the pump supply line in the event of leakage of the fluid being pumped through or past the pump diaphragm. In this way, even the pump is employed for handling corrosive or highly chemically reactive materials, such as acids, the pump operating equipment will not be damaged by such materials in the event of failure of the diaphragm. This feature may also prevent damage to other property and to personnel and will avoid loss of chemicals being handled.

How the foregoing objects and advantages are obtained, together with others which will be apparent to those skilled in the art is explained more fully herebelow with reference to the accompanying drawing illustrating the preferred embodiment of the equipment and in which.

Figures 1, 2, 3, 4:
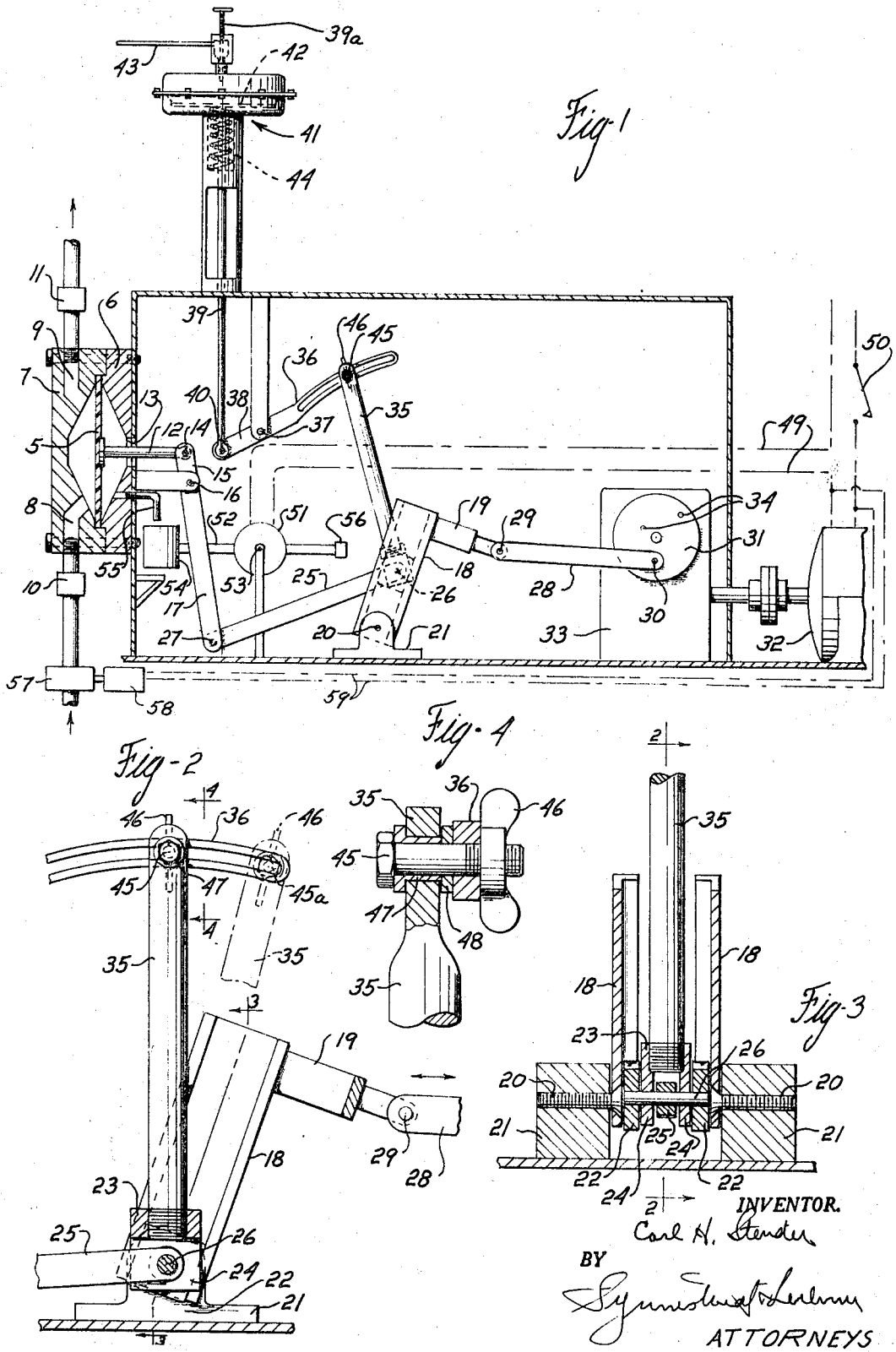
FIGURE 1 is an elevational view, with certain parts in vertical section, showing a diaphragm pump, operating mechanism and control system in accordance with the present invention.
FIGURE 2 is an enlarged fragmentary view of certain parts of the operating mechanism and control system, with parts shown in different positions as compared with FIGURE 1.
FIGURE 3 is a vertical sectional view taken as indicated by the section line 3—3 on FIGURE 2.
FIGURE 4 is a further enlarged view of a detail taken substantially as indicated by the line 4—4 on FIGURE 2.

Although certain aspects of the present invention are of applicability to a wide variety of pumps, some aspects of the invention are particularly useful in relation to a diaphragm type of pump. The invention is therefore illustrated as applied to a diaphragm type of pump. In the showing in FIGURE 1 the pump diaphragm is indicated at 5, the peripheral edge of this diaphragm being clamped between the two pump parts 6 and 7. The part 7 forms a pumping chamber or cavity at one side of the diaphragm 5 and has an inlet passage 8 and an outlet passage 9 which are respectively controlled by check valves 10 and 11, so that a liquid to be pumped, for instance an acid such as used to control the pH of water in cooling systems of a refinery or of a petro-chemical plant, will flow through the pump in the direction indicated by the arrows.

The pump member 6 defines a chamber at the opposite side of the diaphragm 5 which serves a purpose to be described hereinafter.

An actuating element 12 is connected with the diaphragm 5 and projects generally perpendicular from the diaphragm through an oversized opening 13 in the pump part 6. The actuating element 12 is pivotally connected at 14 with one end 15 of an operating lever pivotally mounted on a fixed bracket at 16, the other end 17 of the lever being connected with the remainder of the pump operating equipment in the manner described below.

A pair of spaced channel members 18—18 interconnected at their upper ends by a yoke 19 are mounted for oscillation by pins 20—20 carried in pedestal bearings or blocks 21—21. Sliding blocks 22—22 are positioned in the two channels 18—18, at opposite sides of the U-shaped member or yoke 23, the legs 24—24 of which embraces one end of the rod or link 25. The parts 22, 24 and 25 are interconnected by a pivot pin 26, so that all of these parts move together generally vertically within the channel members 18, while permitting relative angling of the link 25 and the yoke 23. Link 25 is also pivotally connected at 27 with the arm 17 of the pump actuating lever.

The channel members 18 are adapted to be oscillated by a driving link 28 which is pivotally connected as 29 to the yoke 19 which interconnects the two channel members 18, 18. The other end of the link 28 is mounted on the eccentric pin 30 carried by the rotatively driven member 31. Member 31 is turned by a motor 32 which is connected with the member 31 through speed reducing gearing 33. The rotative member 31 is desirably provided with a plurality of pivot receiving apertures spaced at different differences from its center of rotation, in order to provide for alternative reciprocation of the link 28 through strokes of different length. Two such apertures appear at 34, either of which may be used as an alternate for the location of the pivot 30 as shown.

By virtue of reciprocation of the link 28, the channel members 18 are caused to oscillate, and this in turn imparts a reciprocting motion to the link 25, thereby oscillating lever 15–17, and reciprocating the pump actuating element 12.

Upward and downward adjustment movement of the blocks 22 and the interconnected parts 23, 24, 26 and 25 will cause variation in the stroke of link 25 for a given stroke of link 28, and this is used for adjusting the stroke of the pump, thereby varying the pumping action, as desired.

The position of the parts 22, 23, 24, 26 and 25 is effected according to the present invention by a control system including the parts described below.

First, a link or rod 35 is connected with the yoke 23 and extends upwardly therefrom to a slotted end 36 of a lever which is pivoted at 37 to a fixed part, the other end 38 of this lever being connected by a pivot 40 with a control rod 39 of a control actuating mechanism.

The control rod 39 is adapted to be raised and lowered by a control unit indicated generally at 41. This unit incorporates an air or fluid pressure diaphragm 42 adapted to be flexed downwardly under the influence of air pressure supplied through the control line 43. The downward flexure of the diaphragm 42 is resisted by a spring 44, which also serves to raise the diaphragm when the pressure is reduced or released. The rod 39 is connected with the diaphragm 42 and thus moves upwardly and downwardly according to the pressure delivered through the control line 43. The rod 39 may also be moved by means of the manual control rod 39a which extends upwardly from the diaphragm. In this way whenever desired the control adjustment may be effected manually rather than by air pressure.

The vertical reciprocation of the rod 39 causes the lever 38–36 to oscillate about pivot 37, and with the upper end of link 35 connected with the arm 36, this motion serves to raise and lower the adjustable parts within the channels 18, thereby altering the stroke delivered to the diaphragm of the pump.

The link 35 is fastened to the slotted arm 36 by a bolt 45, with which a wing nut 46 cooperates. A sleeve 47 surrounding the bolt extends through an aperture in the upper end of the link 35 and is adapted to be clamped between the head of the bolt 45 and the washer 48, so that upon tightening the wing nut 46, the position of the bolt and of the sleeve 47 may be fixed at any desired position in the slot of the lever arm 36, while at the same time permitting free swinging or oscillation of the upper end of the link 35 about the axis of the bolt 45.

By the arrangement just described, the ratio of adjustment of the operating mechanism for the pump may be varied for a given adjustment of the control device 41, and this is advantageous for various purposes, as will be pointed out more fully herebelow.

Attention is now directed to the fact that the vertical control link 35 may be adjusted (see FIGURE 2) to a position in which the connected parts at the lower end of the link are so located that the axis of pivot 26 is coincident with the axis with the pivots 20 for the channel 18. This position is shown in full lines in FIGURE 2. In this adjustment, oscillation of the channels 18 will not impart any motion to the link 25, in view of which the diaphragm 5 of the pump will remain stationary and no pumping action will occur.

When the parts are adjusted as just described, it will be noted that the curved and slotted arm 36 of the control lever 36–38 is positioned so that the center point of the curvature coincides with the coincident axes of pivots 26 and 20. Because of this relationship of the parts, the upper end of the link 35 may be adjusted to any position in the slotted arm 36 (for instance the position indicated at 45a) while still retaining the lower end of link 35 in the while still retaining the lower end of link 35 in the position in which no pumping is taking place. Thus it is possible to effect adjustment by means of the control device 41 into a "zero" pumping condition, with any adjustment of the upper end of link 35 in the slotted arm 36.

The motor 32 is provided with a control or operating circuit such as diagrammatically indicated at 49, including a manual shut off switch 50 and also a safety shut off switch 51. The switch 51 is mounted to oscillate with a lever 52 which is pivoted on a fixed part at 53. One end of this lever (the left end as viewed in FIGURE 1) is provided with a receptacle or cup 54 adapted to receive liquid accumulating in the chamber provided within pump part 6, a pipe 55 being provided for delivering the liquid from the chamber to the cup. In the event of failure of the diaphragm 5 or in the event of a leakage through or past the diaphragm, the liquid accumulating in the chamber behind the diaphragm will charge the cup or receptacle 54, thus causing the lever 52 to move counterclockwise and thereby open the safety switch 51 to shut off the motor and stop the operation of the pump. A counterweight 56 may be asociated with the lever 52 to counterbalance the weight of the receptacle 54 and thus normally maintain the lever 52 and switch 51 in the closed or operating position.

The supply line to the pump is provided with a shut off valve 57 operated by a solenoid 58 connected as indicated at 59 with the circuit controlled by the switch 51. This provides for shut off of the supply line concurrently with the pump and thus will avoid loss of the liquid being pumped as well as damage to property and personnel in the event of failure of the pump.

Because of these safety features, very promptly upon the development of leakage past the pump diaphragm, the entire mechanism will be shut down and this of course will terminate the pumping action and thus avoid spreading the liquid being pumped over operating parts of the apparatus. This is particularly important when the pump is being utilized in the handling of certain types of liquids, such as acids which would rapidly damage or even destroy operating parts.

Assuming the employment of the equipment of the invention for the pumping of acid, for instance into cooling water employed in a cooling system of a petroleum refinery. In such an installation it is advantageous to establish and maintain a certain pH or acidity in the cooling water. Devices for sensing or reading the pH value are known and it is contemplated that such a device be utilized in accordance with the present invention to regulate the air pressure delivered through the control line 43 to the control device 41. When the pH rises above the desired level, additional acid is required to again lower the pH value, and the invention contemplates that at such time the air pressure supplied through line 43 would be increased, to thereby move the control rod 39 downwardly, thus raising link 35 which, in turn, increases the stroke of the pump diaphragm 5 and thereby deliver a larger quantity of acid to the water of the cooling system. When the pH tends to fall below the desired level, the signal from the pH sensing equipment will result in delivery of a lower pressure of air to the device 41, so that under the influence of the spring 44 the control rod 39 will be raised, thereby lowering the link 35 and thus reduce the stroke of the pump diaphragm, so as to diminish the quantity of acid delivered.

Because of the desirability of employing the equipment to meet a variety of operating conditions, it is important to provide for changing the ratio of adjustment of the pump operating mechanism in relation to the control signal delivered to the control device 41. Such ratio variation is provided for by the capability of adjusting the upper end of the link 35 toward and away from the pivot 37 of the control lever 38–36. By loosening the wing nut 46, the upper end of the link 35 may be shifted to any desired position throughout the length of the slot in the arm 36, an alternative position being shown at 45a in FIGURE 2, as is mentioned above.

I claim:

1. Pump operating equipment for use with a pump having an actuating element reciprocable through a pump actuating stroke, comprising a driving member, linkage interconnecting the driving member and the pump actuating element and including a stroke adjusting member shiftable through a control range to vary the stroke of the pump actuating element, a control link pivotally connected at one end with said stroke adjusting member, and mechanism for longitudinally shifting the control link including a pivotally mounted lever one arm of which is slotted, pivot means for connecting the other end of the control link with the slotted arm of said lever, controllable means for pivoting said lever, and means for adjustably fixing said pivot means in different positions on the slotted arm of said lever.

2. Equipment according to claim 1 in which the slotted arm of the pivotally mounted lever is curved generally about the pivotal connection of said one end of the control link with the stroke adjusting member.

3. Pump operating equipment for use with a pump having an actuating element reciprocable through a pump actuating stroke, comprising a driving member, linkage interconnecting the driving member and the pump actuating element and including a stroke adjusting member shiftable to vary the stroke of the pump actuating element through a control range one limit of which corresponds to zero pumping condition, a control link pivotally connected at one end with said stroke adjusting member, and mechanism for longitudinally shifting the control link including a pivotally mounted lever one arm of which is curved and slotted, pivot means for connecting the other end of the control link with the slotted arm of said lever, controllable means for pivoting said lever, and means for adjustably fixing said pivot means in different positions on the slotted arm of said lever, the curvature of the slotted end of the lever being developed about a center point coincident with the pivotal connection of the control link with the stroke adjusting member, so that adjustment to zero pumping condition may be effected with the pivot means for the link in any adjusted position along said slotted arm.

4. Pump operating equipment for use with a pump having an actuating element reciprocable through a pump actuating stroke, comprising a driving member, linkage interconnecting the driving member and the pump actuating element and including an oscillatable member and a stroke adjusting member shiftable through a control range at one limit of which the adjusting member is located at the axis of oscillation of the oscillatable member, a control link pivotally connected at one end with said stroke adjusting member, and mechanism for longitudinally shifting the control link and thus the stroke adjusting member including a pivotally mounted lever having a slotted arm, pivot means for connecting the other end of the control link with the slotted arm of said lever, controllable means for pivoting said lever, the slotted arm being curved about a center point substantially coinciding with pivotal connection of the control link with the stroke adjusting member, and means for adjustably fixing said pivot means in different positions on the slotted arm of said lever.

References Cited

UNITED STATES PATENTS

| | | | |
|---|---|---|---|
| 2,197,730 | 4/1940 | Mugford | 103—38 |
| 2,548,738 | 4/1951 | Orlich et al. | 103—38 |
| 2,873,611 | 2/1959 | Biermann | 103—38 |
| 2,909,163 | 10/1959 | Biermann | 74—40 |
| 2,972,894 | 2/1961 | Bennett | 74—40 |
| 3,105,442 | 10/1963 | Howerton | 103—150 |
| 3,176,623 | 4/1965 | Howerton | 103—150 |
| 3,309,474 | 3/1967 | Heinrich | 103—25 |

FOREIGN PATENTS

| | | |
|---|---|---|
| 870,268 | 2/1941 | France. |
| 1,231,767 | 4/1960 | France. |

WILLIAM L. FREEH, *Primary Examiner.*

U.S. Cl. X.R.
74—40; 92—5; 103—25